Figure 1:
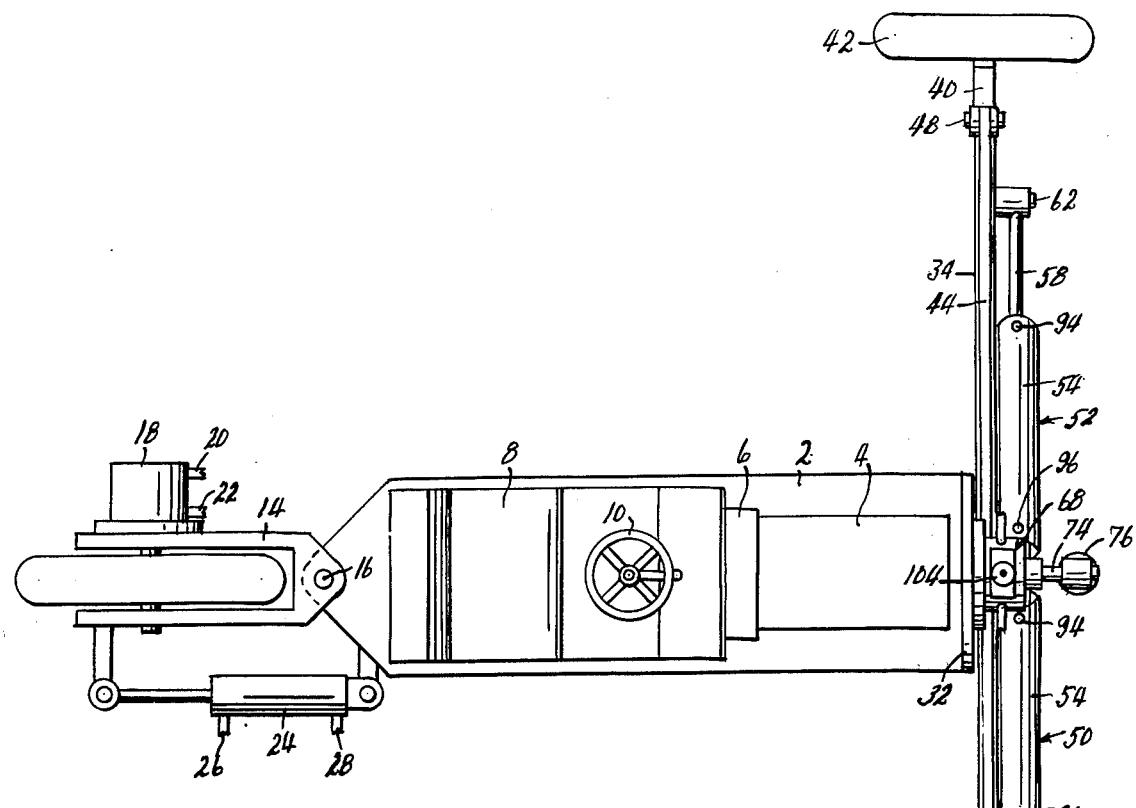

United States Patent [19]

Mika

[11] 4,126,322
[45] Nov. 21, 1978

[54] ANTI-OVERTURNING VEHICLE

[76] Inventor: Herbert L. Mika, 1601 Central Ave., Kansas City, Kans. 66102

[21] Appl. No.: 785,338

[22] Filed: Apr. 7, 1977

[51] Int. Cl.² .................................................. B60G 17/00
[52] U.S. Cl. .................................................... 280/6.11
[58] Field of Search ............... 280/6 R, 6 H, 6.1, 6.11

[56] References Cited

U.S. PATENT DOCUMENTS

| 2,954,833 | 10/1960 | Davidson | 280/6.11 |
| 3,184,867 | 5/1965 | Symmank | 280/6.11 |
| 3,806,141 | 4/1974 | Janer | 280/6.1 |

Primary Examiner—Richard A. Bertsch
Attorney, Agent, or Firm—John A. Hamilton

[57] ABSTRACT

A self-propelled vehicle including a frame having ground-engaging wheels at each side thereof, the wheels being carried rotatably at either end of an axle carried pivotally by the frame on a horizontal, fore-and-aft axis, and a power device for tilting the axle transversely of the vehicle to keep the frame in a normal horizontal position when the vehicle traverses sloping ground transversely to the slope of the ground, so as to prevent overturning of the vehicle when the slope of the ground is steep. The power device operates automatically with no attention from the driver required, and also functions to maintain the wheels in vertical planes to further improve the stability of the vehicle.

6 Claims, 4 Drawing Figures

U.S. Patent   Nov. 21, 1978   Sheet 1 of 2   4,126,322

ANTI-OVERTURNING VEHICLE

This invention relates to new and useful improvements in vehicles, and has particular reference to vehicles the intended usages of which dictate that they commonly must negotiate steeply sloping ground surfaces. This includes farm tractors, highway servicing equipment, and the like.

Accidents occurring when a vehicle must traverse steeply sloping ground, transversely to the inclination thereof, are unfortunately all too common. Usually they occur when the driver attempts to negotiate a slope which is too steep, with the result that the vehicle turns over and rolls in a transverse direction, and often result in the fatal crushing or other serious injury of the driver under the rolling vehicle. The provision of a vehicle having means operable to prevent these tragic accidents is the primary object of the present invention.

Generally, this object is accomplished by the provision of a vehicle having a frame carrying the power plant, driver's seat and the like, and having at least one transverse axle having a ground-engaging wheel rotatably mounted at each end thereof, the axle being pivoted at its midpoint to the frame on a horizontal, fore-and-aft axis, and power means for tilting the axle when one of the wheels is disposed on higher ground than the other, so that the frame remains horizontal and upright, as well as transversely centered between the wheels, at all times. The axle may carry either the front wheels or the rear wheels of the vehicle, as desired, or both if two tilting axles are employed. However, it is preferable, as shown, that a single tilting axle be used, carrying either the front or rear wheels, and that a single wheel, disposed at the longitudinal midline of the vehicle, be employed at the opposite end of the vehicle, so that it need not be tilted laterally of the vehicle on sloping terrain. Also, while it would be possible to make steering connections to the wheels of the tilting axle, it is preferable in the interests of simplicity and economy to provide for steering of the vehicle by turning the single wheel at the vehicle midline about a vertical axis.

Another object is the provision of a vehicle of the character described wherein the power means for tilting the axle functions entirely automatically, requiring no attention from the driver to bring the vehicle frame to its normal upright position regardless of the variable slopes the vehicle may be traversing.

A further object is the provision of a vehicle of the character described in which the axle is not only pivoted as described, but in which the wheels at its ends are also pivoted relative to the axle to remain in vertical planes despite the sloping ground. This maintains the vehicle weight still more accurately centered transversely between lines of ground contact of the wheels, and thus still further improves the stability of the vehicle.

Other objects are simplicity and economy of construction, and efficiency and dependability of operation.

Figure 2:
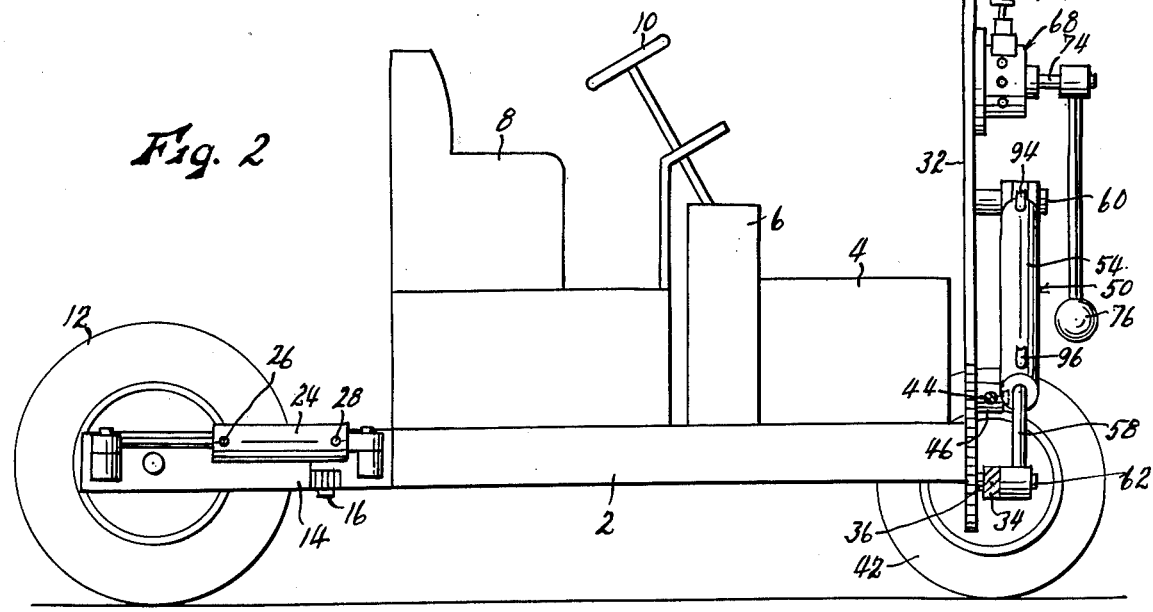
Figure 3:
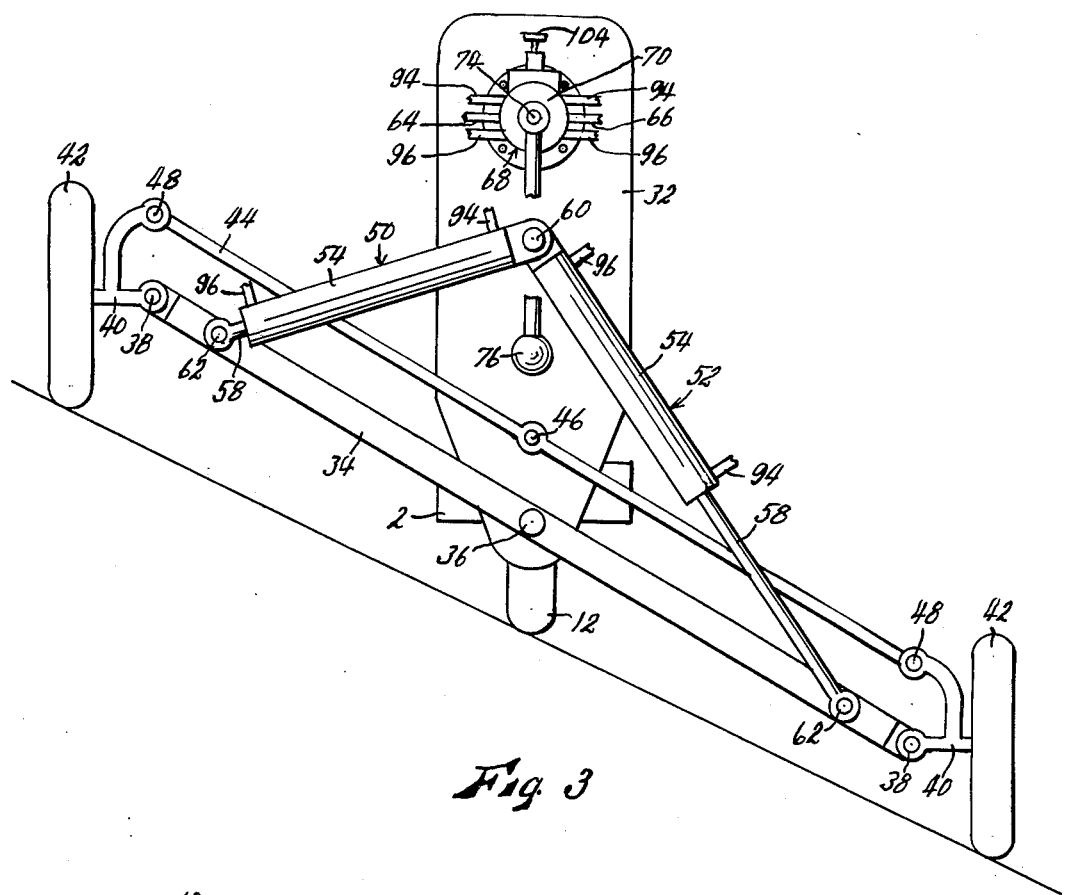
Figure 4:
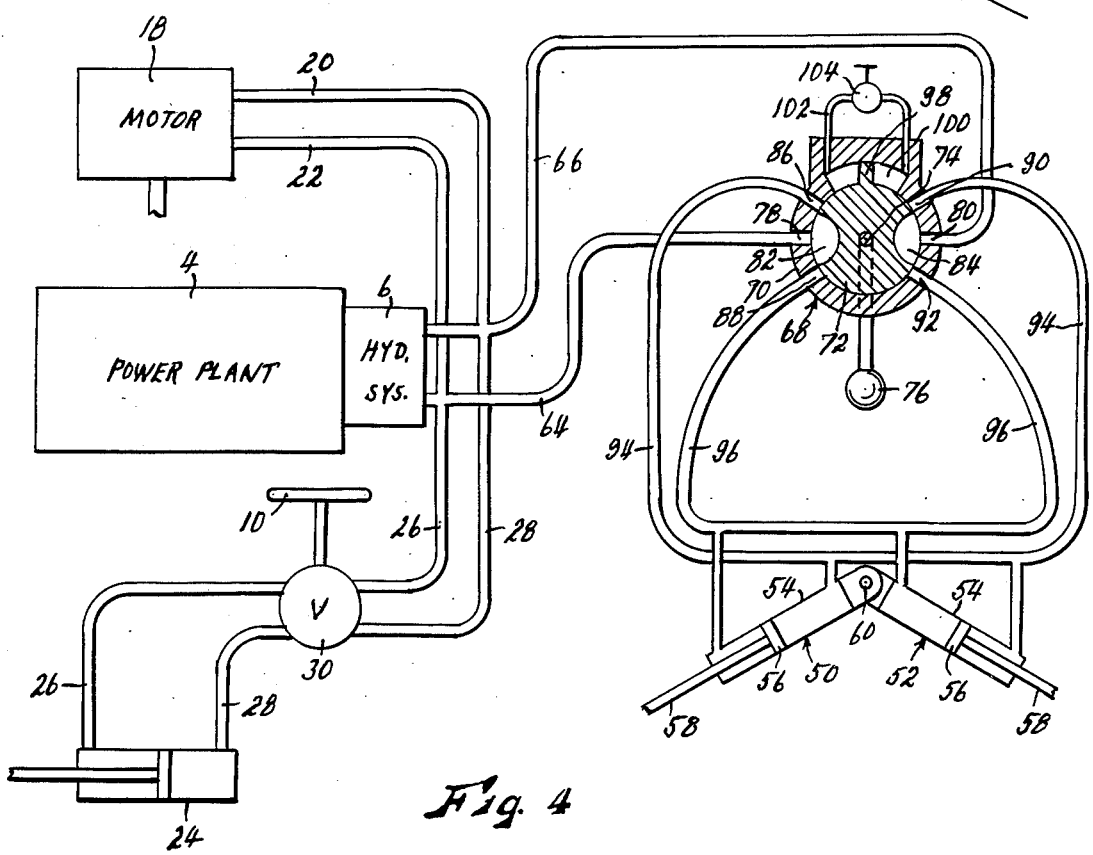

With these objects in view, as well as other objects which will appear in the course of the specification, reference will be had to the accompanying drawing, wherein:

FIG. 1 is a top plan view of an anti-overturning vehicle embodying the present invention, FIG. 2 is a side elevational view of the vehicle, FIG. 3 is a front elevational view of the vehicle, shown traversing sloping terrain, and FIG. 4 is a schematic diagram of the hydraulic system of the vehicle.

Like reference numerals apply to similar parts throughout the several views, and the numeral 2 applies to the frame or chassis of the vehicle. Said frame is generally planar and is elongated from front to rear, and carries the power plant 4, which may be an internal combustion engine, the pump and other elements of a hydraulic system, which is indicated generally by the numeral 6, and which is driven by power plant 4, the operator's seat 8 and steering wheel 10.

At its rearward end, frame 2 is provided with a single ground-engaging drive wheel 12, disposed at the longitudinal midline of the vehicle and carried rotatably by a clevis 14 which is in turn pivoted to frame 2 on a vertical axis just forwardly of said wheel, as at 16. Said wheel is rotatably driven by a hydraulic motor 18 mounted on clevis 14 and having flexible hose connections 20 and 22 to hydraulic system 6. Said motor may be provided with other standard controls, which are not pertinent to the present invention and are now shown. The vehicle may be steered by means of a double-acting hydraulic ram 24 pivotally interconnecting frame 2 to clevis 14 eccentrically to the axis of the pivotal connection of said clevis to frame 2. Said ram is provided with flexible hose connections 26 and 28 to hydraulic system 6, through a hydraulic control valve 30 which is operated by steering wheel 10 to selectively extend or retract the ram. Further details of the steering system are not considered to be pertinent to the present invention. At its forward end, frame 2 has rigidly affixed thereto by any suitable means, not shown, a strong vertical plate 32, which carries elements of the anti-overturning system to be described. Said plate may be considered to be an element of the frame.

Extending laterally of the vehicle, just forwardly of plate 32, is a strong front axle 34, which is freely pivoted at its midpoint to the lower portion of plate 32, as at 36. Said axle has a length substantially greater than the width of frame 2. Pivoted to each end of said axle, as at 38, on an axis parallel to axle pivot 36, is a wheel carrying bracket 40, each of said brackets carrying a ground-engaging front wheel 42 for rotation thereon on a horizontal axis transverse to the vehicle. A wheel positioning control bar 44 is disposed above axle 34, being parallel to and coextensive with said axle. At its midpoint, it is pivoted to plate 32 on an axis spaced above and parallel to axle pivot 36, as at 46, and at each end it is pivoted to the corresponding wheel bracket 40 on an axis spaced above and parallel to pivot 38 of said bracket, as at 48. Thus whenever axle 34 is tilted transversely of the vehicle to accomodate the vehicle for use on transversely sloping terrain, as will appear, the planes of wheels 42 are maintained parallel to the vertical midplane of frame 2.

The tilting of axle 34 is controlled by a pair of doubleacting hydraulic rams 50 and 52. As shown, each of said rams includes a hydraulic cylinder 54 having a piston 56 operable therein and a piston rod 58 fixed to said piston and extending axially from said cylinder. The cylinders are pivoted to plate 32 on a common horizontal fore-and-aft axis above axle pivot 36, as at 60, and the extended ends of piston rods 58 are pivoted to axle 34 as at 62, respectively in oppositely spaced apart relation from axle pivot 36.

Hydraulic fluid for operating rams 50 and 52 is supplied by hydraulic system 6 of the vehicle through flexible supply hose 64 and return hose 66, under the control of a tilt-sensitive valve indicated generally by the numeral 68. As best shown in FIGS. 3 and 4, valve 68 includes a hollow cylindrical housing 70 having an axis parallel to axle pivot 36, and a closely fitting cylindrical spindle 72 carried rotatably in said housing. An axial stem 74 fixed to said spindle extends exteriorly of housing 70, and has a weighted pendulum 76 fixed to its extended end and depending vertically therefrom. Hydraulic supply hose 64 and return hose 66 are connected respectively into diametrically opposite ports 78 and 80 of housing 70, so as normally to interconnect them into diametrically opposite cavities 82 and 84 of spindle 72. The housing also has a pair of ports 86 and 88 disposed in opposite angularly spaced relation from port 78. When the vehicle is disposed on transversely level terrain, cavity 82 does not connect port 78 with either of ports 86 or 88, but will interconnect port 78 alternatively with one of ports 86 or 88 when the vehicle is tilted in respectively opposite directions. Similarly, housing 70 is provided with a pair of ports 90 and 92 cooperating in like manner with housing port 80 and spindle cavity 84. Ports 86 and 90 are interconnected by an external hose 94 which is also interconnected to the upper end of cylinder 54 of hydraulic ram 50, and to the lower end of cylinder 54 of hydraulic ram 52. Similarly, housing ports 88 and 92 are connected by an external hose 96 which is connected to the lower end of the cylinder of ram 50, and the upper end of the cylinder of ram 52.

To dampen any free-swinging movement of pendulum 76, valve spindle 72 is provided with a radially projecting arm 98 movable in a closely fitting cavity 100 provided therefor in housing 70. The angularly opposite ends of said cavity, which is filled with hydraulic fluid, are interconnected by an external conduit 102 in which is interposed a manually adjustable throttling valve 104.

In operation it will be seen that whenever the vehicle is operating on transversely level ground, housing 70 and spindle 72 of tilt-sensitive valve 68 will have the relative positions shown in FIG. 4, with spindle cavities 82 and 84 sealed from hoses 94 and 96 communicating with rams 50 and 52, whereby the rams are hydraulically locked against either extension or retraction by the sealing therein of the hydraulic fluid contained therein. However, if for example the vehicle should enter upon transversely sloping ground inclined in the direction shown in FIG. 3, vehicle frame 2 of course tends to tilt in the same direction, causing housing 70 of valve 68 to turn in a clockwise direction around valve spindle 72, which is of course prevented from turning by the action of pendulum 76. This relative movement of the valve housing and spindle causes spindle cavity 82 to interconnect housing ports 78 and 88, whereby hydraulic fluid is supplied to ram 50 to retract it, and to ram 52 to extend it, and also causes spindle cavity 84 to interconnect ports 80 and 90, whereby fluid from the opposite ends of the ram cylinders is exhausted through hose 94 to return hose 66. The rams thus tilt frame 2 toward its normal upright position, and when it is fully returned to its upright position, valve housing 70 will again be in its normal position relative to spindle 72, and the system will come to rest, with axle 34 hydraulically locked at an angle relative to frame 2 such that frame 2 is upright. If the vehicle enters on terrain sloped oppositely to that shown, the action is reversed, hose 94 becoming the supply hose and hose 96 the return hose, rather than vice versa as in the example given, and frame 2 is tilted oppositely relative to the frame. The response of the system to tilt the vehicle frame to its upright position is almost instantaneous, beginning as soon as front axle 34 begins to tilt from horizontal. Thus, since the inclination of the ground is virtually never instantaneous, frame 2 remains virtually level and upright at all times, the rams 50 and 52 commencing their levelling action as soon as the tilting of axle 34 begins, provided that the rate of fluid delivery to the rams is sufficiently large. The restriction to fluid flow of throttling valve 104, relative to fluid driven by arm 98 of valve spindle 72, dampens and reduces any free-swinging movement of pendulum 76, which could otherwise cause alternately opposite operation, or "hunting" of the levelling system The maintenance of frame 2 in its normal level and upright position, as described, maintains the center of gravity of the large mass of said frame and the elements carried thereby in accurately centered relation transversely between the centers of wheels 42. Since this center of gravity is normally positioned well above center pivot 36 of the axle, this centering greatly reduces any possibility that the vehicle could overturn laterally when traversing steeply sloping ground transversely to the slope thereof, and eliminates a very common type of serious accident with vehicles of certain types. The maintenance of wheels 42 themselves in vertical planes, as provided by control bar 44, provides that the frame center of gravity is maintained centered not only between the centers of wheels 42, but also centered between the points of contact of said wheels with the ground, thus further improving the stability of the vehicle against transverse overturning. Actually, front axle 34 need not usually be as long as illustrated, although it is so shown for clarity. With it as long as shown, the wheel tilting action of control bar 44 may not be necessary, but it becomes increasingly important if axle 34 is shortened, since if it is shortened to a certain degree, the line of ground contact of the wheel lowermost on the slope could be moved dangerously close to the vertical plane of the frame center of gravity on steep slopes, if the wheel axes were simply longitudinal extensions of axle 34.

While I have shown and described a specific embodiment of my invention, it will be readily apparent that many minor changes of structure and operation could be made without departing from the spirit of the invention.

What I claim as new and desire to protect by Letters Patent is:

1. An anti-overturning vehicle comprising:
   a. a frame,
   b. a transverse axle extending transversely to said frame, pivoted at its midpoint to said frame on a horizontal, fore-and-aft axis, and extending laterally in both directions from said frame, said frame being laterally tiltable relative to said axle,
   c. a ground-engaging wheel carried at each end of said axle for rotation on an axis transverse to said vehicle, and
   d. power operating means operable to tilt said frame relative to said axle, whereby said frame is maintained in a horizontal, upright position, laterally centered between said wheels, when said vehicle is traversing sloping ground transversely to the inclination of said ground, said operating means comprising hydraulic rams interconnecting said frame and said axle at points thereof spaced apart from the pivotal connection of said axle to said frame, and operable by extension of retraction thereof to tilt said frame in respectively opposite directions relative to said axle, and hydraulic control means operable to deliver hydraulic fluid under pressure to said rams to selectively either extend or retract them, whereby said frame may be tilted selectively in either direction relative to said axle.

2. A vehicle as recited in claim 1 wherein each of said hydraulic rams includes a hydraulic cylinder having a piston operable therein and operable to be extended or retracted by the delivery of hydraulic fluid to the respectively opposite ends of said cylinder, and wherein said hydraulic control means comprises:

a. a hydraulic valve having two members relatively rotatable about an axis parallel to the pivotal connection of said axle to said frame, the first of said members being fixed to said frame, said valve members having a relative central position in which the valve does not deliver hydraulic fluid to either end of the hydraulic cylinders of said rams, this central position occurring when said frame is in its horizontal, upright position, said valve members being operable by relative rotation thereof in respectively opposite directions to deliver fluid to respectively opposite ends of said cylinders, and in each case to exhaust fluid from the opposite ends of said cylinders, the direction of tilting of the frame relative to the axle thus produced being opposite to the direction of tilting of said axle from horizontal, and b. means operable to prevent rotation the second of said valve members.

3. A vehicle as recited in claim 2, wherein said hydraulic valve in said relative central position of the relative rotation of the members thereof, is operable to seal both ends of the hydraulic cylinders of said rams, whereby said frame and said axle are hydraulically locked in any relative angularity they may then occupy.

4. A vehicle as recited in claim 2 wherein said means preventing rotation of said second valve member constitutes a pendulum fixed relative to said second valve member and depending vertically therefrom.

5. A vehicle as recited in claim 4 with the addition of damping means operable to inhibit free swinging movement of said pendulum.

6. A vehicle as recited in claim 5 wherein said damping means comprises:

a. a piston member fixed to one of said valve members and operable in a fluid-filled cavity formed in the other of said valve members whenever said valve members turn relatively, b. a conduit interconnected into said cavity at respectively opposite sides of said piston member, and c. a throttling valve interposed in said conduit.

* * * * *